United States Patent [19]

Kawamura

[11] Patent Number: 5,178,481
[45] Date of Patent: Jan. 12, 1993

[54] SHAFT SLIDE-LOCKING APPARATUS

[75] Inventor: Tadashi Kawamura, Oume, Japan

[73] Assignee: Kabushiki Kaisha Toshiba, Kanagawa, Japan

[21] Appl. No.: 807,416

[22] Filed: Dec. 13, 1991

Related U.S. Application Data

[63] Continuation of Ser. No. 675,111, Mar. 25, 1991, abandoned, which is a continuation of Ser. No. 460,387, Jan. 3, 1990, abandoned, which is a continuation of Ser. No. 172,405, Mar. 24, 1988, abandoned.

[30] Foreign Application Priority Data

Mar. 25, 1987 [JP] Japan .................................. 62-42703

[51] Int. Cl.⁵ ...................... F16C 11/04; E05D 11/08
[52] U.S. Cl. ........................................ 403/92; 403/97;
403/145; 16/337; 16/341; 16/342
[58] Field of Search ................ 403/92, 91, 166, 227,
403/146, 147, 409.1, 95, 97, 113, 120, 145;
16/337, 340, 342, 341, 339; 411/538

[56] References Cited

U.S. PATENT DOCUMENTS

| | | | |
|---|---|---|---|
| 4,615,464 | 10/1986 | Byrns | 16/341 X |
| 4,639,147 | 1/1987 | Schwarz | 16/340 X |
| 4,658,547 | 4/1987 | Oboza | 16/341 X |
| 4,730,364 | 3/1988 | Tat-Kee | 16/337 |
| 4,781,422 | 11/1988 | Kimble | 16/337 X |
| 4,845,809 | 7/1989 | Pillifant, Jr. | 16/341 X |
| 4,917,343 | 4/1990 | Wainscott | 403/97 X |
| 4,986,507 | 1/1991 | Chiang | 403/91 X |
| 5,008,976 | 4/1991 | Busch | 16/342 X |
| 5,022,778 | 6/1991 | Lu | 403/120 |
| 5,052,078 | 10/1991 | Hosoi | 16/341 X |

FOREIGN PATENT DOCUMENTS 1393671  5/1975  United Kingdom ............... 16/339

Primary Examiner—Peter M. Cuomo
Attorney, Agent, or Firm—Finnegan, Henderson, Farabow, Garrett and Dunner

[57] ABSTRACT

A shaft slide-locking apparatus comprises a stationary shaft housing, a rotary main shaft extending through the shaft housing and rotatably disposed in the shaft housing; a movable cam axially movable on the rotary main shaft; an elastic member disposed between the movable cam and the shaft housing; and a control cam opposing the movable cam and fixed to the rotary main shaft and pushing the movable cam on the side of the shaft housing to press the elastic member towards the shaft housing and the rotary main shaft when the rotary main shaft is rotated.

11 Claims, 2 Drawing Sheets

SHAFT SLIDE-LOCKING APPARATUS

This application is a continuation of application Ser. No. 07/675,111, filed Mar. 25, 1991, now abandoned, which is a continuation of application Ser. No. 07/460,387, filed Jan. 3, 1990, now abandoned, and which is a Rule 60 continuation application of Ser. No. 07/172,405 filed Mar. 24, 1988, now abandoned.

The present invention relates to a shaft slide-locking apparatus used in a mechanism required to re-adjust the construction of the apparatus and easily lock and release the apparatus from a locked state.

BACKGROUND OF THE INVENTION

In portable computers and word processors, for example, the positioning angle of a display device can be adjusted by a shaft locking device.

In the conventional shaft locking device, an end of a shaft is attached into a cylindrical member, and a coil spring is disposed outside the shaft and the cylindrical member. The spring has an inner diameter slightly smaller than the outer diameters of the shaft and the cylindrical member, and both ends of the coil spring are free ends.

Such a conventional shaft locking device mentioned above has a structure in which slip is generated between the coil spring and the shaft so that the shaft is greatly worn. To overcome this problem, it is necessary to harden the contact surfaces of the shaft and the coil spring, thereby increasing the cost of the apparatus. Further, the weight of the apparatus is increased, and the strict accuracy of the size of the apparatus is required since the slipping action is utilized in a direction in which the coil spring is fastened, thereby reducing the yield.

SUMMARY OF THE INVENTION

To overcome the problems mentioned above, an object of the present invention is to provide a shaft slide-locking apparatus in which the cost and weight of the apparatus are reduced and the yield is improved.

With the above object in view, in a shaft slide-locking apparatus of the present invention, an elastic member is disposed between a shaft housing and a movable cam moved on a rotary main shaft in a state in which the movable cam is prevented from being rotated. When the rotary main shaft is rotated, the movable cam is pushed towards the shaft housing side by a control cam so that the elastic member is pressed towards both the shaft housing and the rotary main shaft.

According to the construction mentioned above, when the rotary main shaft is rotated, the movable cam is pushed onto the shaft housing side through the control cam, so that the elastic member is pressed towards the shaft housing and the rotary main shaft commonly, thereby increasing the resistance against the rotation and performing the shaft slide-locking of the apparatus.

BRIEF DESCRIPTION OF THE DRAWINGS

The present invention will be more apparent from the following preferred embodiments thereof in conjunction with the accompanying drawings in which.

DETAILED DESCRIPTION OF THE PREFERRED EMBODIMENTS

The preferred embodiments of the present invention will now be described in detail with reference to the accompanying drawings.

Figure 1:
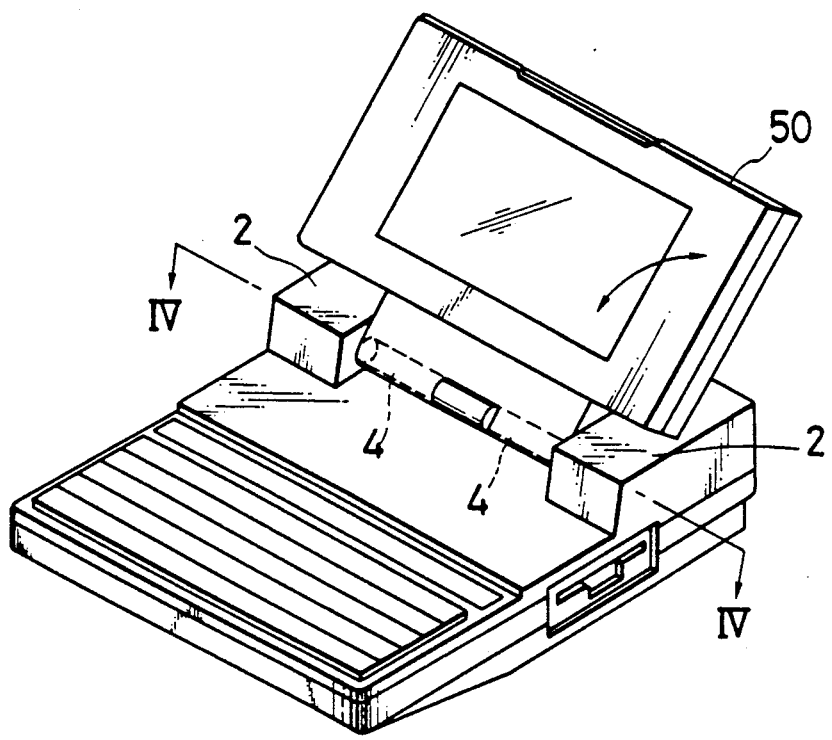
FIG. 1 is a perspective view of a portable computer having a shaft slide-locking apparatus in accordance with one embodiment of the present invention.
Figure 2:
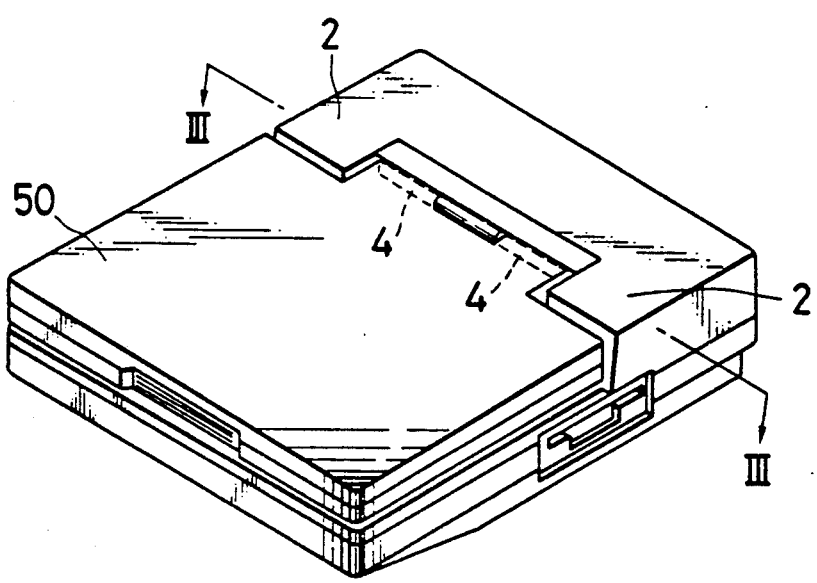
FIG. 2 is a perspective view showing a state in which a lid of the portable computer of FIG. 1 is closed.

FIG. 1 shows a portable computer of a lap top type provided with a shaft slide-locking apparatus of the present invention. FIG. 2 shows a closed state of a lid 50 of the shaft slide-locking apparatus. The shaft slide-locking apparatus comprises shaft fixing bodies 2 disposed on both sides of a shaft support portion for supporting the lid 50. A main portion of the shaft slide-locking apparatus is disposed within the shaft fixing bodies 2.

Figure 3:
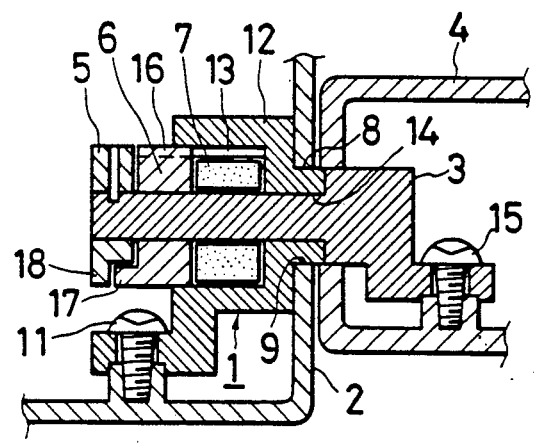
FIG. 3 is a sectional view taken along Line III—III of FIG. 2 and showing a state in which locking of the shaft slide-locking apparatus is released.
Figure 4:
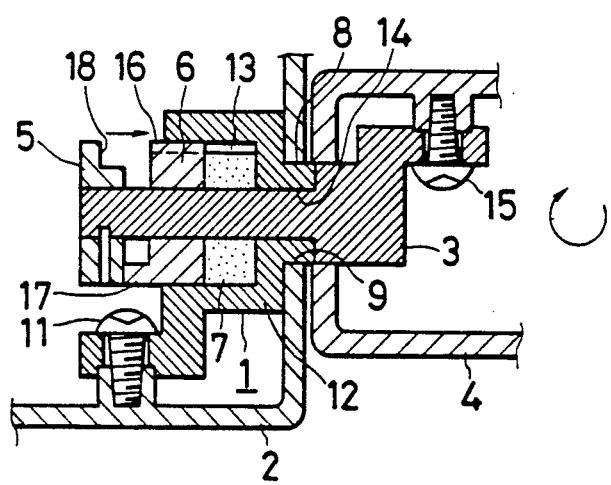
FIG. 4 is a sectional view taken along Line IV—IV of FIG. 1 and showing the locking state of the shaft slide-locking apparatus of FIG. 3.

As shown in FIGS. 3 and 4, the shaft slide-locking apparatus comprises a shaft housing 1, each of the respective shaft fixing bodies 2, a rotary main shaft 3, a rotary body 4, a control cam 5, a movable cam 6 and an elastic member 7.

The shaft housing 1 is made of synthetic resin and is integrally molded in the shape of a cylinder as a whole. The shaft housing 1 has a small diameter cylindrical portion 8 at one end thereof fitted into a hole 9 of each of the shaft fixing bodies 2, and has a projection 10 extending at the other end in the axial direction and fixed to each shaft fixing body 2 through a fastening member 11 such as a vis.

A groove-shaped guide portion 13 is formed along the axial direction on the inner surface of a large diameter cylindrical portion 12 of the shaft housing 1.

The rotary main shaft 3 is made of synthetic resin and is rotatably attached to the shaft housing 1 in a state in which the rotary main shaft 3 is extended through a hole 14 of the shaft housing 1. One end of the rotary main shaft 3 is fixed to the rotary body 4 through a vis 15, and an annular elastic member 7, the movable cam 6 and the control cam 5 are disposed along the other end of the rotary main shaft 3 sequentially from the inside thereof. The elastic member 7 is molded by hard rubber such as urethane rubber, has an inner diameter slightly larger than the outer diameter of the rotary main shaft 3, and has an outer diameter slightly smaller than the inner diameter of the shaft housing 1.

The movable cam 6 is made of synthetic resin, and is movably attached onto the rotary main shaft 3. The movable cam 6 has a key groove 16 disposed in an outer circumferential portion thereof and engaged with the guide portion 13 of the shaft housing 1 to prevent the movable cam from being rotated. The movable cam 6 further has a projection 17 formed on an end surface thereof and opposing the control cam 5.

Figure 5:
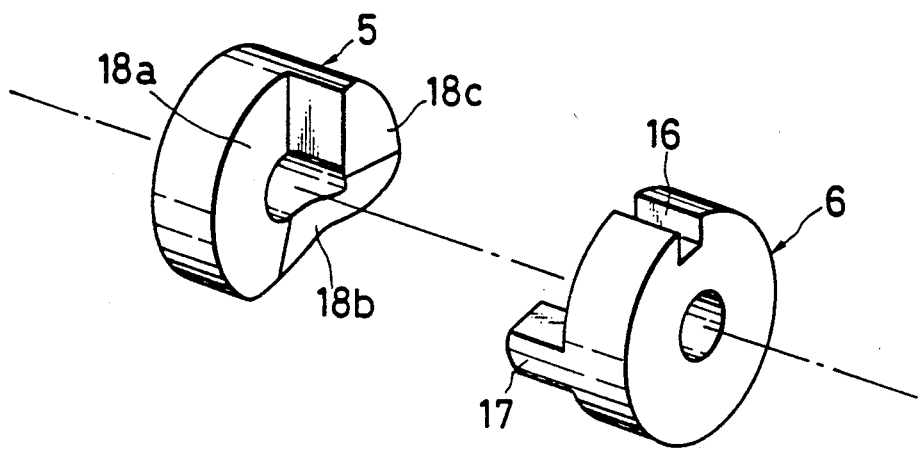
FIG. 5 is an exploded perspective view of a control cam and a movable cam of FIGS. 3 and 4.

The control cam 5 is made of synthetic resin and is fixed to the rotary main shaft 3, and has a cam portion 18 opposing the movable cam 6 and contacting the projection 17. As shown in FIG. 5, the cam portion 18 of the control cam 5 has three cam surfaces 18a, 18b and 18c axially engaged with the projection 17 of the movable cam 6. The cam surfaces 18a and 18c are flat, and the cam surface 18b is a slanting surface connected to the cam surfaces 18a and 18c. When the control cam 5 is integrally rotated with the rotary main shaft 3, the cam portion 18 pushes the projection 17 so that the movable cam 6 is axially moved on the rotary main shaft 3.

In the shaft slide-locking apparatus constructed above, FIG. 3 shows a state in which the slide-locking is released and the elastic member 7 is not compressed by moving the movable cam 6 on the side of the control cam 5. When the rotary body 4 and the rotary main shaft 3 begin to be rotated, the movable cam 6 begins to be axially moved by the control cam 5 on the side of the elastic member 7. Initially, the movable cam 6 barely presses against the elastic member 7 so rotational resistance is not generated, and the rotary main shaft 3 smoothly rotates. However, when the movable cam 6 begins to press the elastic member 7, the elastic member 7 is compressed by the movable cam 6, entirely fills the inner space of the shaft housing 1, and further applies a force to the rotary main shaft 3 in a direction in which the rotation of the rotary main shaft 3 is prevented. As a result, resistance against rotation is increased and the rotary main shaft 3 is slide-locked. The slide-locking range can be arbitrarily set by changing the shapes of the control and movable cams 5 and 6 engaged with each other. When the rotary body 4 is rotated in the reverse direction, the movable cam 6 returns onto the side of the control cam 5 by the biasing force of the elastic member 7 in accordance with the rotation of the control cam 5, thereby releasing the shaft slide-locking of the apparatus.

Accordingly, the shaft slide-locking structure mentioned above has no especially worn portions so that the structure has high durability and can be sufficiently used even when the respective portions of the structure are molded of synthetic resin.

As mentioned above, in accordance with a shaft slide-locking apparatus of the present invention, the respective portions of the apparatus can be constituted by synthetic resin so that the cost and weight are reduced, control of the accuracy of the size of the apparatus is facilitated, and the yield is improved.

Further, the present invention can be applied to a portable computer and a word processor in which a display section is not used as a lid as in FIG. 1 and is pivoted in a predetermined position.

What is claimed is:

1. A shaft slide-locking apparatus comprising:
   a shaft housing;
   a rotary main shaft extending through the shaft housing and disposed for rotational movement in the shaft housing;
   a movable cam axially movable on the rotary main shaft;
   an elastic member disposed between the movable cam and the shaft housing; and
   control cam means fixed to the rotary main shaft for engaging the movable cam to slide the movable cam against the elastic member in response to the rotational movement of the rotary main shaft.

2. A shaft slide-locking apparatus as claimed in claim 1, further comprising a rotary body wherein the rotary main shaft has opposed ends, one end being connected to the rotary body and the other end being connected to the control cam means.

3. A shaft slide-locking apparatus as claimed in claim 1, wherein the movable cam has a projection projecting in the axial direction of the rotary main shaft, and the control cam means has a plurality of cam surfaces disposed to engage the projection.

4. A shaft slide-locking apparatus as claimed in claim 3, wherein the elastic member comprises an expandable and compressible rubber annulus.

5. A shaft slide-locking apparatus for a portable computer having a main body and a display panel that is hinged to the main body through a stationary shaft housing disposed on the main body, the shaft slide-locking apparatus comprising:
   a rotary main shaft extending from the display panel through the shaft housing and rotatably disposed in the shaft housing;
   a movable cam axially movable on the rotary main shaft;
   an elastic member disposed between the movable cam and the shaft housing;
   control cam means fixed to the rotary main shaft for engaging the movable cam to axially move the movable cam against the elastic member in response to rotational movement of the rotary main shaft.

6. A shaft slide-locking apparatus as claimed in claim 5, further comprising a rotary body wherein the rotary main shaft has opposed ends, one end being connected to the display panel and the other end being connected to the control cam means.

7. A shaft slide-locking apparatus as claimed in claim 5, wherein the movable cam has a projection projecting in the axial direction of the rotary main shaft, and the control cam means has a plurality of cam surfaces disposed to engage the projection.

8. A shaft slide-locking apparatus as claimed in claim 7, wherein the elastic member comprises an expandable and compressible rubber annulus.

9. A shaft slide-locking apparatus for a portable computer having a main body and a display panel that is hinged to the main body through first and second stationary shaft housings disposed on opposing sides of the main body, the shaft slide-locking apparatus comprising:
   first and second rotary main shafts each extending from the display panel through one of the first and second shaft housings, each of the shafts being rotatably disposed in one of the first and second shaft housings;
   first and second movable cams axially movable on each of the rotary main shafts and each having a projection extending in the axial direction of the rotary main shafts;
   first and second elastic members disposed between each of the movable cams and one of the first and second shaft housings;
   first and second control cam means respectively fixed to the first and second rotary main shafts, each of the control cam means having a plurality of cam surfaces disposed to engage the projections of each respective movable cams against the elastic members in response to rotational movement of the rotary main shafts.

10. A shaft slide-locking apparatus comprising:
    a shaft housing having an axial guide portion;
    a rotary main shaft extending through the shaft housing and disposed for rotational movement in the shaft housing;
    a movable cam axially movable on the rotary main shaft, the movable cam having a groove for engagement with the guide portion of the shaft housing to prevent the movable cam from rotating;

an elastic member disposed between the movable cam and the shaft housing; and control cam means fixed to the rotary main shaft for engaging the movable cam to axially move the movable cam against the elastic member in response to the rotational movement of the rotary main shaft.

11. A shaft slide-locking apparatus for a portable computer having a main body and a display panel that is hinged to the main body through a stationary shaft housing disposed on the main body and having an axial guide portion, the shaft slide-locking apparatus comprising:

a rotary main shaft extending from the display panel through the shaft housing and rotatably disposed in the shaft housing;

a movable cam axially movable on the rotary main shaft, the movable cam having a groove for engagement with the guide portion of the shaft housing to prevent the movable cam from rotating;

an elastic member disposed between the movable cam and the shaft housing;

control cam means fixed to the rotary main shaft for engaging the movable cam to axially move the movable cam against the elastic member in response to rotational movement of the rotary main shaft.

* * * * *